(12) United States Patent
Swett

(10) Patent No.: US 9,903,971 B2
(45) Date of Patent: *Feb. 27, 2018

(54) APPARATUS AND METHOD FOR GENERATING BROAD BANDWIDTH ACOUSTIC ENERGY

(75) Inventor: Dwight W. Swett, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 970 days.

This patent is subject to a terminal disclaimer.

(21) Appl. No.: 13/069,559

(22) Filed: Mar. 23, 2011

(65) Prior Publication Data

US 2012/0069708 A1   Mar. 22, 2012

Related U.S. Application Data

(60) Provisional application No. 61/316,526, filed on Mar. 23, 2010.

(51) Int. Cl.
| | |
|---|---|
| E21B 47/14 | (2006.01) |
| G01V 1/40 | (2006.01) |
| B06B 1/06 | (2006.01) |
| H04R 17/00 | (2006.01) |
| H01L 41/00 | (2013.01) |
| H02N 2/00 | (2006.01) |
| G10K 13/00 | (2006.01) |

(52) U.S. Cl.
CPC ............ *G01V 1/40* (2013.01); *B06B 1/0618* (2013.01); *B06B 1/0644* (2013.01); *G10K 13/00* (2013.01)

(58) Field of Classification Search
CPC ............. Y01S 367/911; Y01S 367/912; B06B 1/0603; G10K 9/122

USPC .......................................... 367/157–166, 174
See application file for complete search history.

(56) References Cited

U.S. PATENT DOCUMENTS

| | | | |
|---|---|---|---|
| 1,507,171 A * | 9/1924 | Hahnemann et al. ........ | 367/175 |
| 3,716,828 A * | 2/1973 | Massa .......................... | 367/157 |
| 4,047,060 A | 9/1977 | Schafft | |
| 4,353,122 A | 10/1982 | Cubberly | |
| 4,768,615 A | 9/1988 | Steinebrunner et al. | |
| 5,063,542 A * | 11/1991 | Petermann ............ | B06B 1/0611 |
| | | | 181/106 |
| 5,313,025 A | 5/1994 | Roessler | |
| 5,600,610 A | 2/1997 | Hill | |

(Continued)

OTHER PUBLICATIONS

Eugenio Lo Piccolo et al., "Corrosion and Environmental Cracking Evaluation of High Density Brines for Use in HPHT Fields"; Society of Petroleum Engineers, SPE Paper No. 97593; May 17-19, 2005.

(Continued)

*Primary Examiner* — Firmin Backer
*Assistant Examiner* — Jerold Murphy
(74) *Attorney, Agent, or Firm* — Cantor Colburn LLP

(57) ABSTRACT

An acoustic transmitter includes: an acoustic diaphragm configured to transmit acoustic waves into a medium; a piezoelectric actuator assembly configured to deform in an axial direction in response to an applied electrical signal; and a highly incompressible elastic material disposed between the piezoelectric actuator and the acoustic diaphragm and configured to transmit pressure waves to the acoustic diaphragm in response to motion of the piezoelectric actuator.

19 Claims, 16 Drawing Sheets

(56) References Cited

U.S. PATENT DOCUMENTS

| | | | |
|---|---|---|---|
| 5,927,699 A * | 7/1999 | Nakajima | B60K 5/1283 |
| | | | 267/140.13 |
| 6,081,064 A * | 6/2000 | Pfeiffer | G10K 9/13 |
| | | | 310/334 |
| 6,909,666 B2 | 6/2005 | Dubinsky et al. | |
| 7,772,746 B2 * | 8/2010 | Keolian et al. | 310/339 |
| 8,441,889 B2 * | 5/2013 | Swett | G01V 1/40 |
| | | | 367/35 |
| 2004/0032957 A1 | 2/2004 | Hansen | |
| 2010/0315899 A1 | 12/2010 | Swett | |

OTHER PUBLICATIONS

Notification of Transmittal of the International Search Report and the Written Opinion of the International Searching Authority, or the Declaration; PCT/US2010/038826; Feb. 21, 2011.

Notification of Transmittal of the International Search Report and the Written Opinion of the International Searching Authority, or the Declaration; PCT/US2011/029624; Nov. 28, 2011.

* cited by examiner

APPARATUS AND METHOD FOR GENERATING BROAD BANDWIDTH ACOUSTIC ENERGY

CROSS REFERENCE TO RELATED APPLICATIONS

This application claims the benefit of an earlier filing date from U.S. Provisional Application Ser. No. 61/316,526 filed Mar. 23, 2010, the entire disclosure of which is incorporated herein by reference.

BACKGROUND

Acoustic measurements are an important tool in measuring properties of various media, such as the composition of earth formations. For example, measurements of the speed of acoustic waves through formations allows for the estimation of properties such as the types and amounts of materials making up a formation, and formation porosity.

Acoustic transmitters typically include an actuator configured to perform an oscillating motion. This oscillating motion is transferred to an acoustic diaphragm that in turn generates acoustic waves. Such transmitters typically include a direct coupling mechanism between the actuator and the diaphragm. Typical piezoelectric acoustic transmitters include a piezoelectric actuator directly attached to an interior of an acoustic diaphragm within an acoustic chamber. These transmitters generally include an oil-filled acoustic chamber formed with the actuator and the diaphragm. Such transmitters are generally limited in their output bandwidth, particularly at lower frequencies.

BRIEF SUMMARY

An acoustic transmitter includes: an acoustic diaphragm configured to transmit acoustic waves into a medium; a piezoelectric actuator assembly configured to deform in an axial direction in response to an applied electrical signal; and a highly incompressible elastic material disposed between the piezoelectric actuator and the acoustic diaphragm and configured to transmit pressure waves to the acoustic diaphragm in response to motion of the piezoelectric actuator.

A method for estimating a property in a borehole penetrating an earth formation includes: conveying a carrier through the borehole; transmitting an acoustic wave into at least one of the borehole and the formation via the acoustic transmitter; and receiving the acoustic wave using an acoustic detector to estimate the property. The carrier includes at least one acoustic transmitter that includes: an acoustic diaphragm configured to transmit acoustic waves into a medium; a piezoelectric actuator assembly configured to deform in an axial direction in response to an applied electrical signal; and a highly incompressible elastic material disposed between the piezoelectric actuator and the acoustic diaphragm and configured to transmit pressure waves to the acoustic diaphragm in response to motion of the piezoelectric actuator.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Apparatuses and methods for generating acoustic energy are described herein. An acoustic transmitter includes a piezoelectric actuator assembly that is indirectly and elastodynamically coupled to an acoustic diaphragm to create frequency specific motion of the acoustic diaphragm through actuation of the piezoelectric device. "Elastodynamic coupling" refers to transmission of the piezoelectric actuator motion to the diaphragm through a structurally elastic medium. In one embodiment, the structurally elastic medium includes a highly incompressible material such as a highly incompressible elastomer. In one embodiment, the piezoelectric actuator assembly and the diaphragm are separated by a gap that is filled with the highly incompressible material. In one embodiment, the actuator assembly and the diaphragm are at least partially disposed in an acoustic cavity and separated by a cavity at least partially filled with a highly-incompressible elastomer cavity. The actuator assembly and the diaphragm may each be at least partially disposed in a cavity filled with the highly incompressible material. The apparatuses and methods described herein exhibit broad frequency bandwidth acoustic output characteristics that are significantly important in systems such as those utilized for downhole logging and/or logging while drilling (LWD) applications. In one embodiment, the actuator assembly includes a high-frequency pressure piston, which is mounted on a piezoelectric structure or otherwise integrated into the actuator assembly, to facilitate interaction between the actuator assembly and the diaphragm and define an interior cavity spacing between the actuator assembly and the diaphragm that is filled with the highly incompressible material.

The elastodynamic coupling serves to amplify the motion of the acoustic diaphragm relative to the motion of the piezoelectric actuator at lower frequency ranges, and also develops a significant acoustic output at higher frequency ranges. The apparatuses described herein provide an ability to amplify the actuator motion at lower ranges (for example about 2 kHz) and intermediate range frequencies (for example about 8 kHz) of operation, while efficiently transmitting actuator motion at higher frequency ranges (for example about 12 kHz) of operation.

Figure 1:
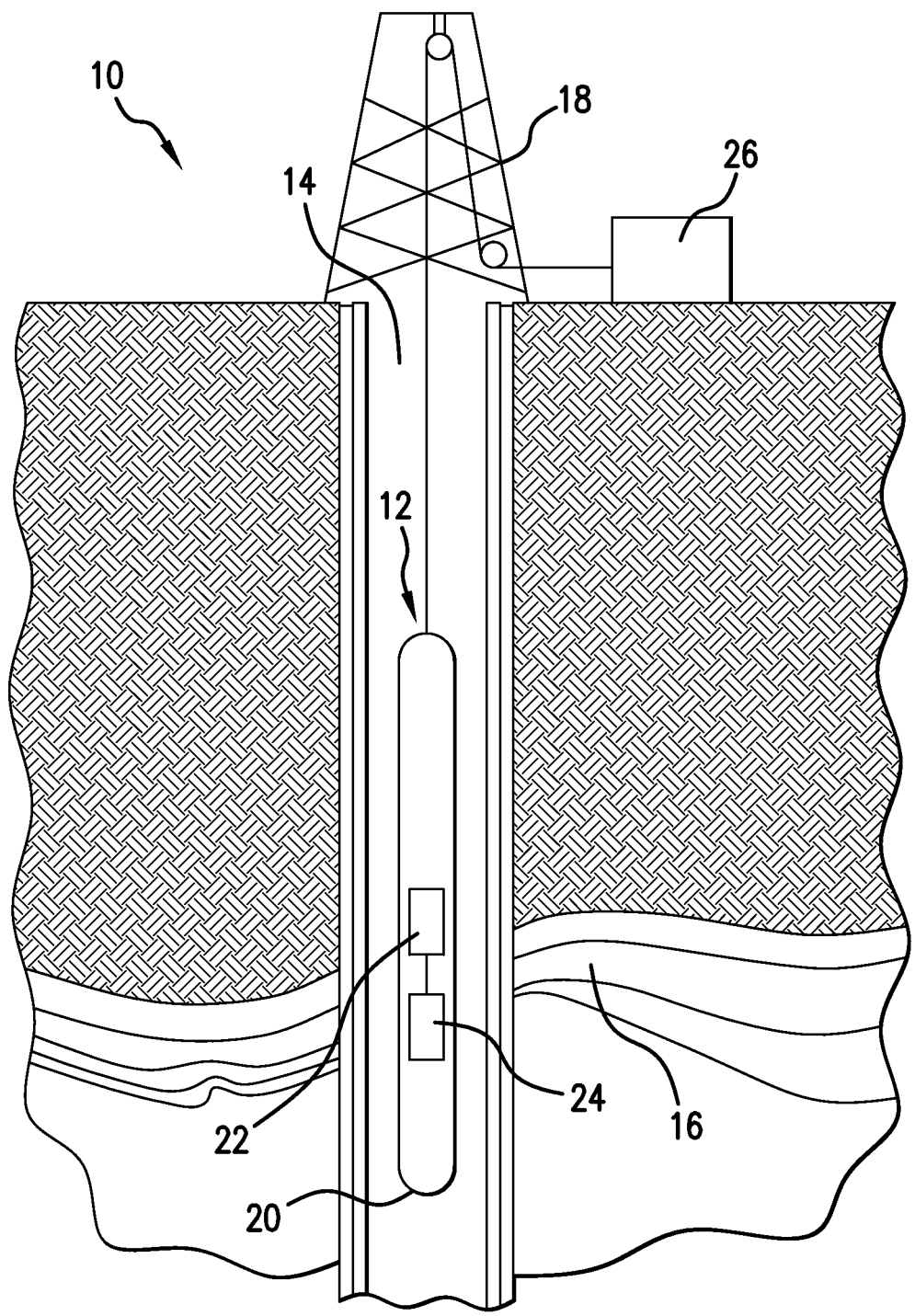
FIG. 1 illustrates an exemplary embodiment of a subterranean well drilling, well logging, evaluation, exploration and/or production system.

Referring to FIG. 1, an exemplary embodiment of a subterranean well drilling, well logging, evaluation, exploration and/or production system 10 includes a borehole string 12 that is shown disposed in a borehole 14 that penetrates at least one earth formation 16 during a subterranean operation. As described herein, "borehole" or "wellbore" refers to a single hole that makes up all or part of a drilled well, and "formations" refer to the various features and materials that may be encountered in a subsurface environment and surround the borehole. A derrick 18 or other structure is configured to support and/or deploy the borehole string 12 and the various components.

In one embodiment, the borehole string 12 includes a logging or measurement tool 20 such as a well logging tool. In one embodiment, the measurement tool 20 is configured as an acoustic measurement tool. The measurement tool 20 is shown in FIG. 1 as a downhole wireline tool, but is not limited thereto, and may be disposed with any suitable carrier. For example, the borehole string 12 may be configured as a drill string that includes one or more pipe sections or coiled tubing that extend downward into the borehole 14 and includes a bottom hole assembly (BHA) having a drill bit. The tool can be configured as a logging-while-drilling (LWD) or measurement-while-drilling (MWD) tool. A "carrier" as described herein means any device, device component, combination of devices, media and/or member that may be used to convey, house, support or otherwise facilitate the use of another device, device component, combination of devices, media and/or member. Exemplary non-limiting carriers include borehole strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

In one embodiment, the measurement tool 20 includes at least one acoustic transmitter 22 configured to generate and transmit acoustic waves and at least one acoustic receiver 24 configured to detect acoustic waves. The acoustic transmitter is configured to transmit acoustic waves into the formation, and the acoustic receiver 24 is configured to detect waves that reflect or otherwise travel through the formation. Although the measurement tool 20 is described herein as a downhole tool, it may be utilized at any desired location, such as a surface location. In addition, the acoustic transmitter 22 and/or the acoustic receiver 24 may be positioned at a surface location. Furthermore, the acoustic transmitter may be incorporated into any type of tool or measurement apparatus configured to utilize acoustic wave generation, and is not limited to downhole applications.

In one embodiment, the downhole tool 20, the acoustic transmitter 22 and/or the acoustic receiver 24 are equipped with transmission equipment to communicate ultimately to a surface processing unit 26. Such transmission equipment may take any desired form, and different transmission media and methods may be used. Examples of connections include wired, fiber optic, wireless connections and memory based systems.

Figure 2:
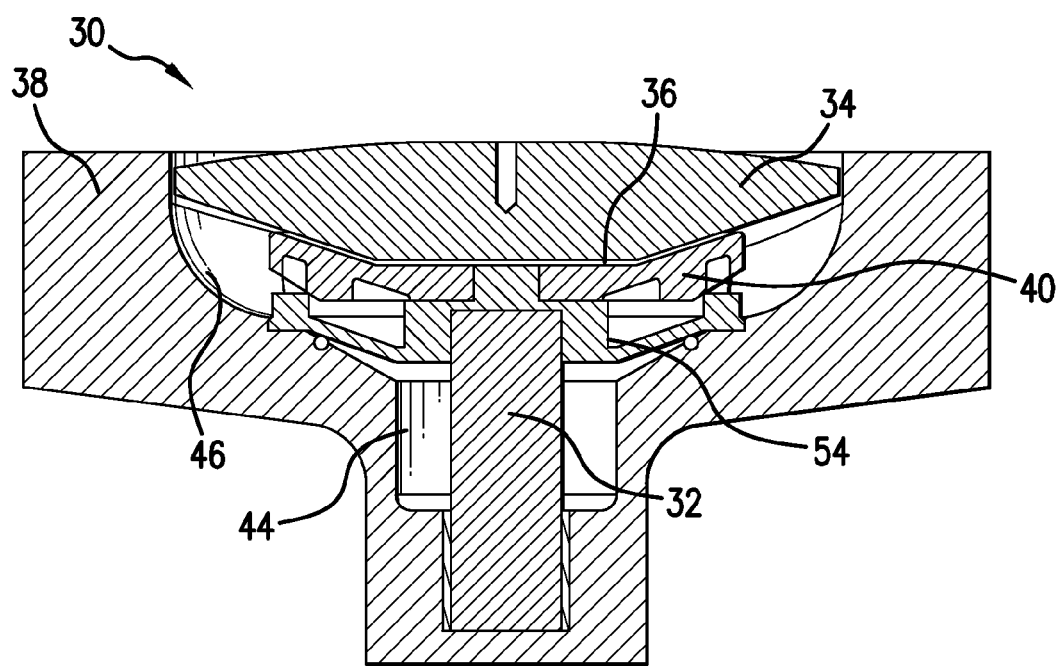
FIG. 2 is a side cross-sectional view of an exemplary embodiment of an elastodynamically coupled acoustic transmitter.
Figure 3:
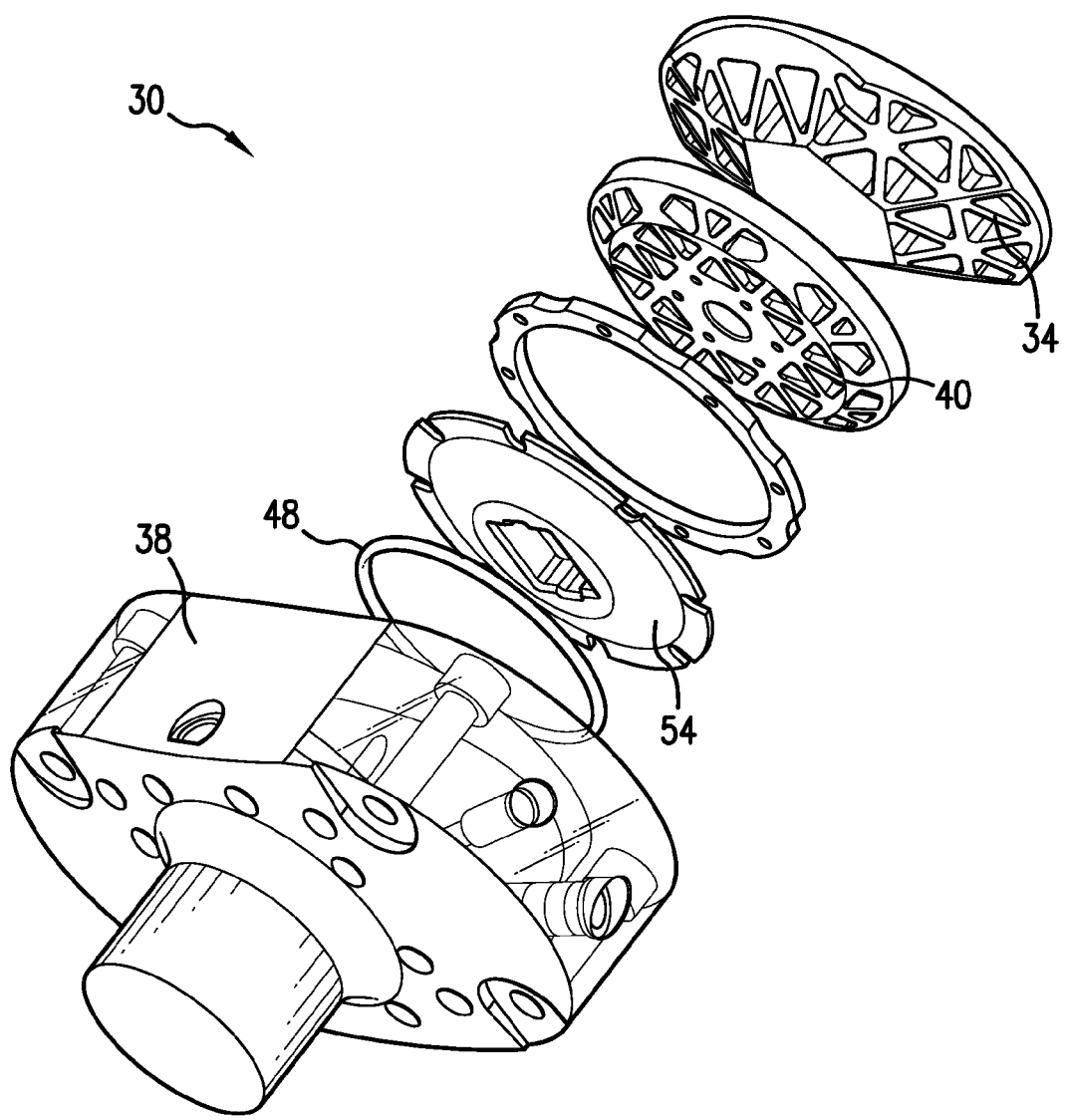
FIG. 3 is an exploded perspective view of an embodiment of the acoustic transmitter of FIG. 2.
Figure 4:
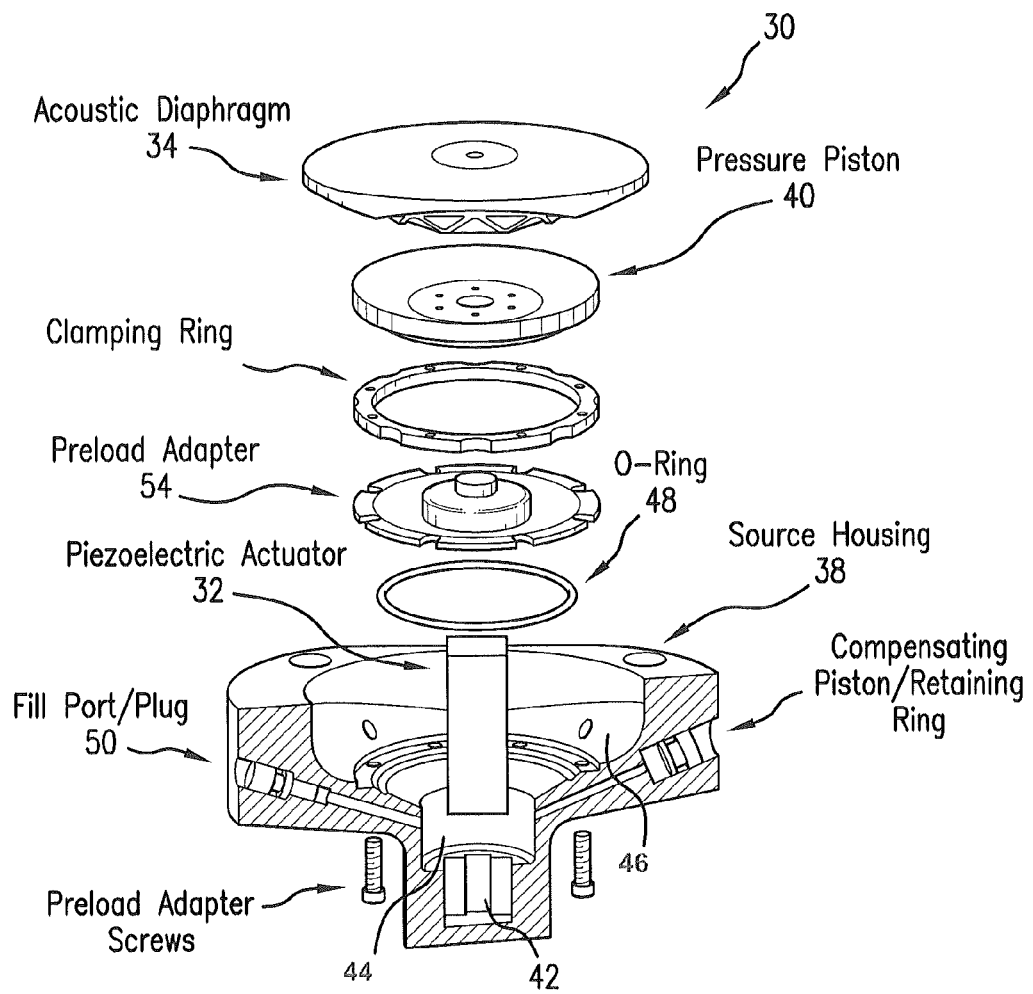
FIG. 4 is an exploded side view of an embodiment of the acoustic transmitter of FIG. 2.

Referring to FIGS. 2-4, an embodiment of an acoustic transmitter 30 includes a piezoelectric actuator assembly 32 and an acoustic diaphragm 34 that are separated by and elastodynamically coupled by a highly incompressible material 36 such as an elastomer. In one embodiment, the acoustic transmitter 30 includes a housing 38 such as a tuned-resonant structural housing that is configured to support the actuator assembly 32 and the diaphragm 34 and form a spacing or gap between the actuator assembly 32 and the diaphragm 34 which is filled by the highly incompressible elastomer 36. The actuator assembly 32 may include a pressure piston 40 that facilitates defining the gap between the actuator assembly 32 and the diaphragm 34. The pressure piston 40 creates a large diameter pressure wave in the elastomer media that translates into motion of the acoustic diaphragm 34.

The highly incompressible material is an elastic material such as a polymer. In one embodiment, the material is an elastomer including a silicone or other polymer material. In one embodiment, the highly incompressible material has a compressibility that is lower than water when constrained. In one embodiment, the highly incompressible material has a bulk modulus of at least about $2 \times 10^9$ Pa.

In the example shown in FIGS. 2-4, the actuator assembly 32 is disposed within the housing 38 and secured by any suitable mechanism. In this example, the actuator is disposed in a recess 42 configured to provide an electrical connection and is coupled to a preload adapter 54 to secure the actuator in place and define an actuator cavity 44 and an acoustic cavity 46 in the housing 38. A sealing mechanism 48 such as an O-ring may be included to affect a seal between the actuator cavity 44 and the acoustic cavity 46. In one embodiment, the actuator cavity 44 is filled with a fluid such as oil at a selected pressure via a fill port 50. The housing 38 may also include a compensating piston or retaining ring to regulate the actuator cavity pressure. In one embodiment, the acoustic cavity 46 is at least partially filled with a highly incompressible material 36 so that a gap between the actuator assembly 32 and the diaphragm 34 is filled with the highly incompressible material 36.

In the example shown in FIG. 4, the acoustic cavity 46 is formed within the housing 38 and defined by the housing 38, the diaphragm 34, an optional preload adapter 54 and the pressure piston 40. In one embodiment, the pressure piston 40 is configured to define the gap between the actuator assembly 32 and diaphragm 34. The pressure piston 40 creates a large diameter pressure wave in the elastomer media that translates into motion of the acoustic diaphragm 34.

Figure 5:
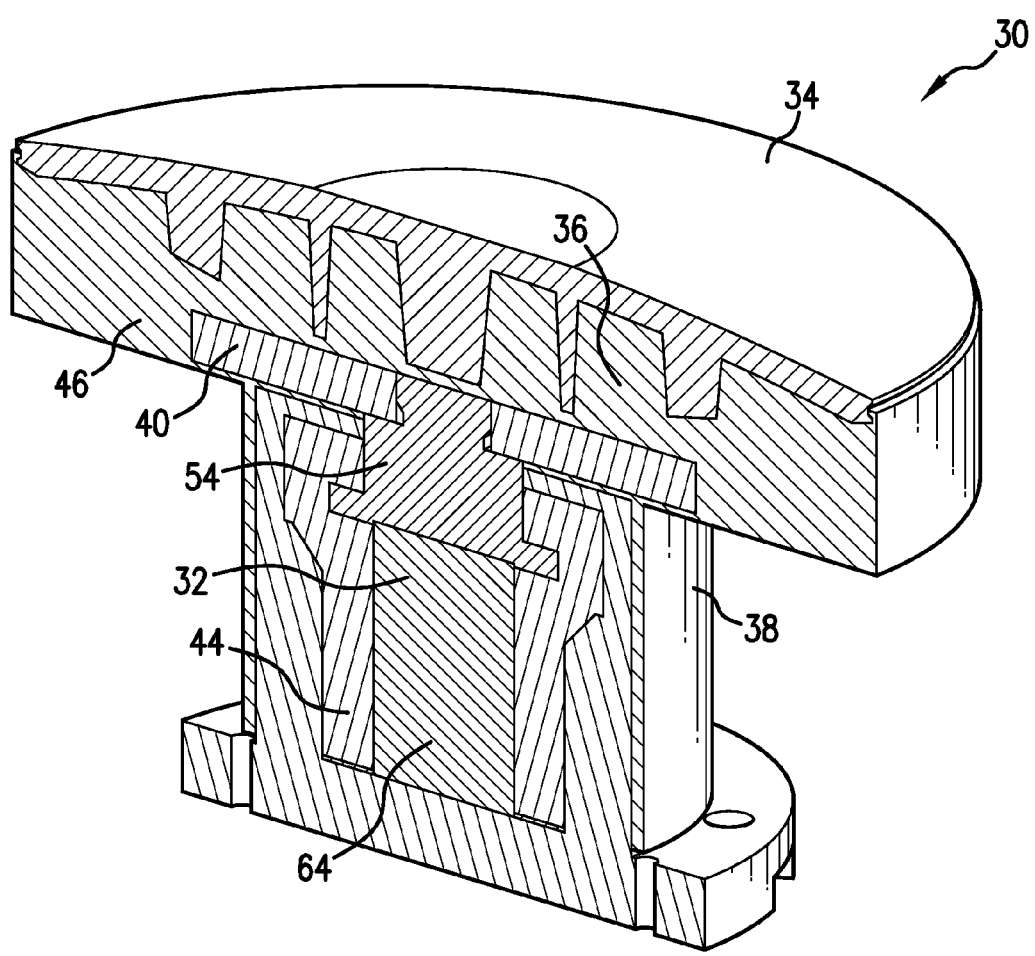
FIG. 5 is a perspective cross-sectional view of an exemplary embodiment of an elastodynamically coupled acoustic transmitter.
Figure 6A:
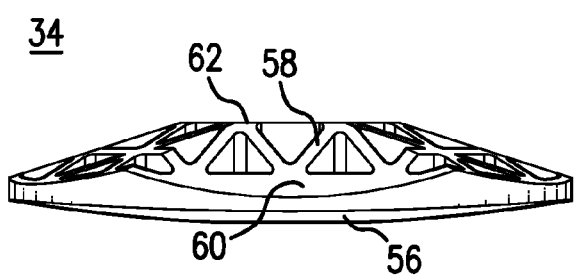
FIGS. 6A-D are a major side view, a top view, a bottom view and a minor side view, respectively, of an exemplary embodiment of an acoustic diaphragm.
Figure 6B:
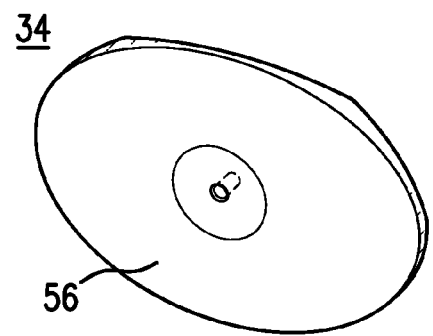
Figure 6C:
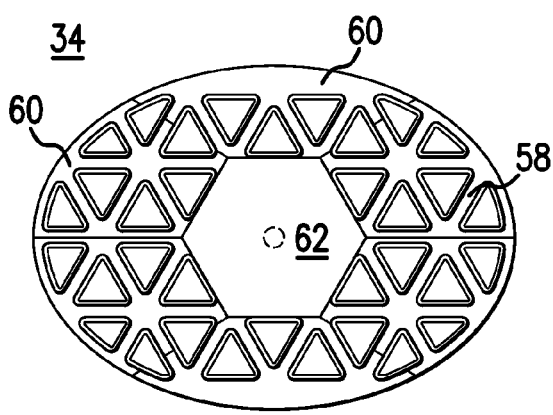
Figure 6D:
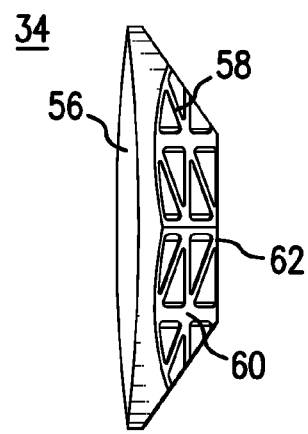
Figure 7:
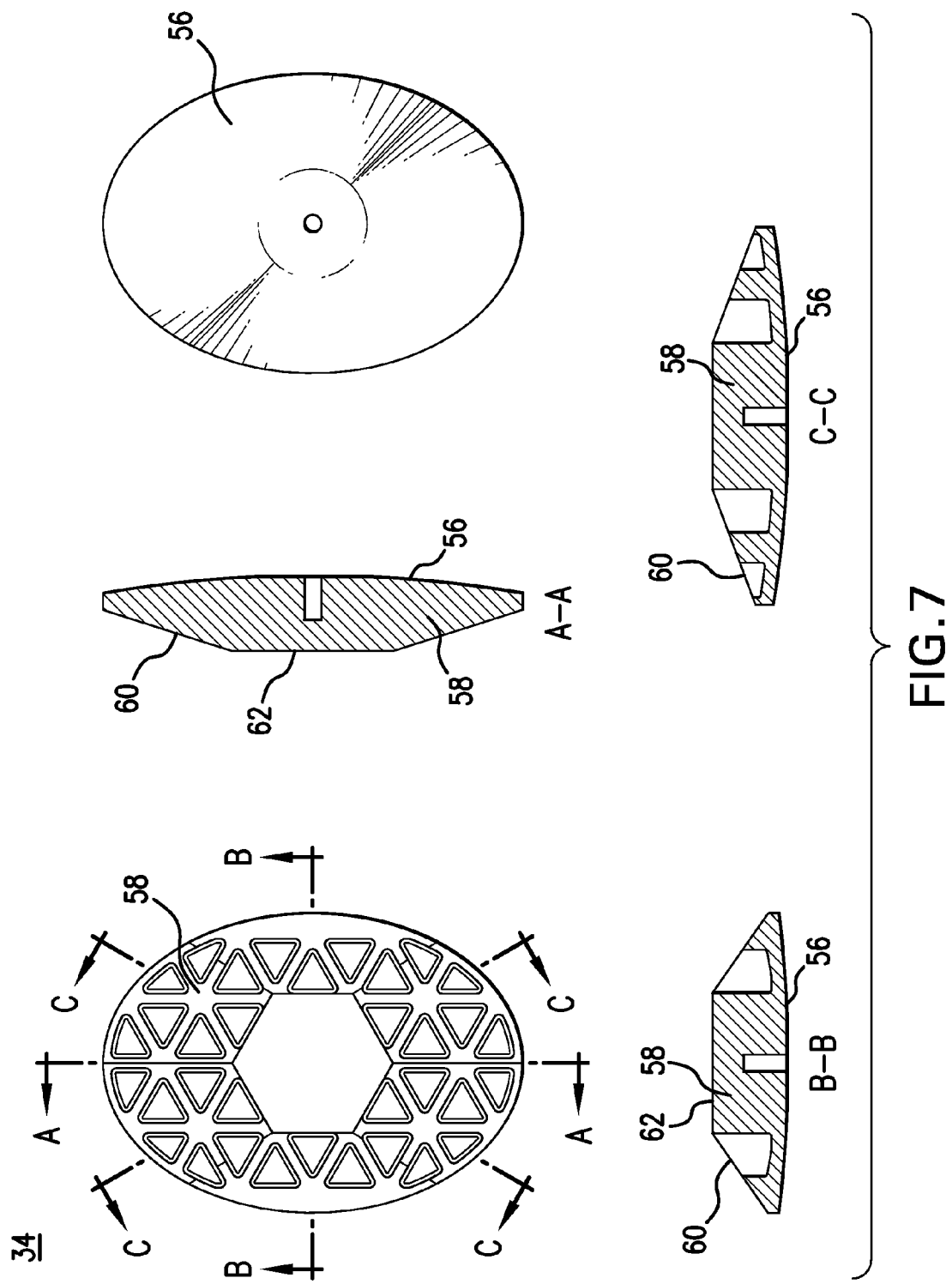
FIG. 7 is an illustration of the acoustic diaphragm of FIGS. 6A-D.

The pressure piston 40 may have any shape suitable to define a selected spacing or gap between the actuator assembly 32 and the diaphragm 34, and facilitate transmission of pressure waves through the highly incompressible material. The pressure piston 40 may be a partially conical shape having a flat portion and a conical portion, as shown in FIGS. 2-4, or may be a circular disk shape as shown in FIG. 5, which illustrates an alternative embodiment of the acoustic transmitter 30. In one embodiment, the pressure piston has a diameter of at least the diameter of the acoustic diaphragm 34 (in the case of a circular diaphragm) or at least equal to a minor diameter of the diaphragm 34 (in the case of an elliptical diaphragm). In one embodiment, the piston 40 has a diameter of at least the portion of the diaphragm 34 that includes a cell structure.

Referring to FIGS. 6A-D and 7, in one embodiment, the acoustic diaphragm 34 is a self-stabilizing dynamic structure having a broad frequency response. The dynamically self-stabilizing characteristics of the acoustic diaphragm 34 maintain a consistently low surface deformation of the diaphragm 34 when subjected to loading from a elastomer cavity pressure wave. This stabilization created on the acoustic diaphragm surface is maintained by the design over a broad operational frequency range that is, for example, well above the resonance bandwidth of the actuator pressure piston.

The acoustic diaphragm 34 includes an acoustic surface 56 that is configured to interact with a medium, such as water or fluid disposed in the borehole 14, that transmits acoustic waves. In one embodiment, the acoustic surface 56 is solid (i.e., having no openings). The diaphragm 34, in one embodiment, includes a plurality of structural members 58 that serve to decrease the weight and increase the rigidity of the diaphragm 34. In one embodiment, the structural members 58 intersect to form geometric shapes (or cells) such as triangles. In one embodiment, the acoustic diaphragm including the surface and the plurality of structural members is machined from one solid piece of material such as aluminum or titanium. The diaphragm may be a generally circular body or may have an elliptical shape as shown in the embodiment of FIGS. 6A-D and 7.

In one embodiment, the diaphragm 34 forms a plurality of facets 60, such as a plurality of paired tri-symmetrical facets. In this embodiment, the diaphragm 34 includes a hybrid geometry of paired tri-symmetric planar facets 60 compatible with the triangular cell structure and an elliptical acoustical surface area 56 to maximize the combination of stiffness to mass distribution over the diaphragm framework and promote the dynamic stabilization of the acoustic diaphragm 34. In one embodiment, the diaphragm 34 includes six planar facets 60. The draft angles utilized in the hexagonal faceting scheme are non-symmetric and customized to tune the acoustic diaphragm drum-head resonant frequency to a selected frequency, such as approximately 11 kHz, when coupled in the elastodynamic cavity assembly.

In one embodiment, the planar facets 60 are symmetrically arranged about a central region of stiffness 62. The central region 62 corresponds to that approximately of the optimal deflection node of the actuator pressure piston diameter. The central region 62 includes a flat surface configured to be positioned parallel to the actuator's axis of motion. The spacing of the actuator assembly 32 and/or the pressure piston 40 in relation to the central region 62 may be selected based on the fundamental resonant mode of transmitter system as well as the overall magnitude of the acoustic output over the operating frequency range. In general, fundamental resonant mode frequency and overall acoustic output magnitude both decrease as the spacing increases. In addition to facet design, other factors having significant influence on high frequency output characteristics include acoustic diaphragm cell wall thickness, facesheet thickness, and edge band thickness.

The piezoelectric actuator assembly 32 includes a piezoelectric structure 64 made from a crystal or other material characterized by the ability to develop an electrical charge when subjected to mechanical strains, referred to as the direct piezoelectric effect. Conversely, such materials undergo a deformation when subjected to an electric potential field, referred to as the inverse piezoelectric effect. Examples of such materials include certain ceramic materials belonging to the ferroelectric group, such as lead zirconate titanate (PZT), which may include mixed crystals of, for example, $PbZrO_3$ and $PbTiO_3$. These materials have the capability to convert mechanical quantities such as stress and strain into electrical voltage and conversely transform electrical voltages into mechanical forces and displacements.

In one embodiment, the actuator is configured so that the displacement of the piezoelectric structure 64 linearly follows the received charge (Q), and as a consequence the flowing current (I=dQ/dt) is proportional to the velocity of the actuator endplate (v=ds/dt). Accordingly, the steepness (slew-rate) of fluctuations in the current (dI/dt) are proportional to the acceleration (a=dv/dt) of the actuator endplate. One or more slew-rate controlled amplifiers or inner current control loops may be utilized to strictly limit input current fluctuations to the actuator assembly 32 to reduce or eliminate bursts of charge that cause excessively high actuator acceleration rates.

Figure 8:
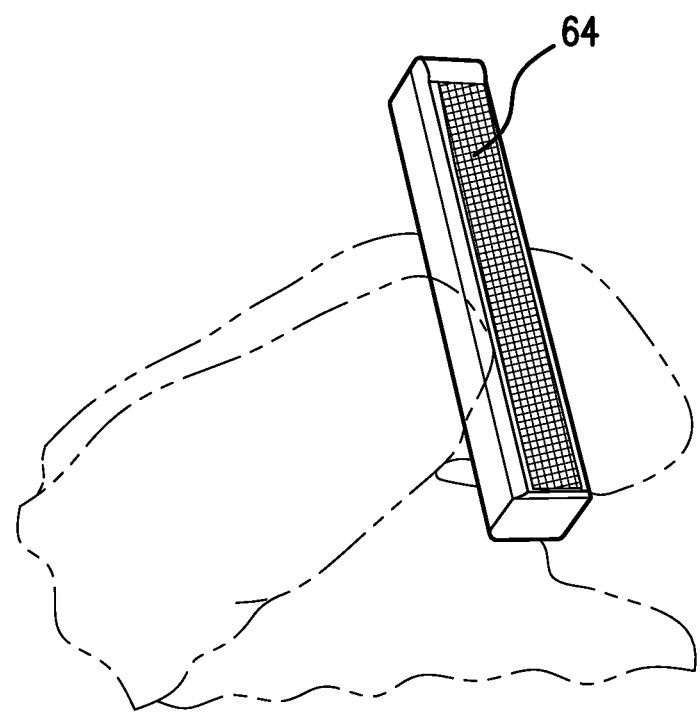
FIG. 8 is a perspective view of a piezoelectric structure for use in an acoustic transmitter.

An example of the piezoelectric structure 64 is shown in FIG. 8. The piezoelectric structure 64 in this example is an elongated ceramic structure configured to gain a deformation of 1.5 to 1.7% in response to a field strength of approximately 2000 V/mm. The piezoelectric structure 64 can be manufactured with multiple layers of ceramic material. For example, the piezoelectric structure 64 includes up to 500 layers of ceramic material, each of which are about 0.1 mm thick. The layers are stacked and sintered to allow maximum displacement to be achieved by a voltage of only 200 V. In one embodiment, a mechanical preloading device is included with the actuator assembly 32 to prevent the piezoelectric structure 64 from being loaded with tensile stress. The preloading device is configured to apply a preloading force of, for example, at least approximately half of the blocking force (FB), to stabilize the actuator assembly 32. Exemplary preloading forces include forces between about 0.5 and 1.0 FB. A controlling mechanism may also be connected to the actuator structure 64 to control the actuator stroke. For example, a strain gauge in combination with a closed loop voltage feedback may be connected to the piezoelectric structure 64. An example of a suitable actuator includes a monolithic layered ceramic actuator having dimensions of 14 mm×14 mm×20 mm with a layer thickness of about 0.1 mm, a maximum blocking force of about 8000 N, a preload force of about 5000 N. A voltage range of about −50 V to +200 V can be applied to achieve displacements in the range of about −7.5 µm to +30.0 µm.

In use, motion from the actuator assembly 32 creates a conically emanating pressure wave in the highly incompressible material 36 that impinges onto the cell structure and back surface (i.e., surface opposite the acoustic surface 56) of the self-stabilizing dynamic diaphragm 34. The actuator pressure piston geometry, cavity volumetric geometry, and highly incompressible material properties may be designed to create an approximately uniform pressure distribution impinging onto the predominant area of the diaphragm back surface. For example, the magnitude of the acoustic output of the acoustic transmitter 30 at the higher frequency range (>10 kHz) is highly dependent on the extent that the diaphragm surface maintains rigid body motion under actuation. The uniformity of the pressure pulse over the diaphragm back surface tends to contribute to the rigid body motion and thereby improve acoustic pressure magnitude. Accordingly, in one embodiment, a surface of the pressure piston is shaped to conform with or be proportional to a shape of at least a portion of the back surface (i.e., surface opposite an acoustic surface of the diaphragm). The shape of the surface of the pressure piston facilitates generation of pressure waves in the highly incompressible material that is uniform over the back surface. For example, the pressure piston 40 is shaped as shown in FIGS. 2-4, including a central flat surface and a peripheral conical surface having a shape that is proportional to or otherwise generally conforms to the shape of at least a portion of the back surface of the acoustic diaphragm.

In one embodiment, the actuator pressure piston 40 has a surface area that is large enough so the surface area moves with motion that is relative rigid body (nondeforming) over the operational frequency range of the device in order to create significant motion of the acoustic diaphragm. In one embodiment, a high performance Beryllium alloy is utilized in combination with a specific pressure piston structure that results in an ultra-lightweight yet extremely stiff device for high pressure generation mechanism through the elastomer cavity medium into the acoustic diaphragm 34.

Effectively, the self-stabilized diaphragm and elastodynamic coupling create a system of structural dynamics of the device that can be characterized by three primary resonant characteristics of the operation. A first fundamental resonant mode is comprised of normal motion of the acoustic diaphragm 34 in synchronous phase with the motion of the actuator assembly 32. A secondary resonant mode (mode-2) is comprised of drumhead flexure of the acoustic diaphragm 34. A tertiary resonant mode (mode-3) is comprised of drumhead flexure of the actuator pressure piston 40.

In one embodiment, the actuator assembly 32 and the acoustic diaphragm 34 are configured to create a resonant interaction effect to increase energy output over the desired operation frequency bandwidth. For example, for high frequency operation such as 10-20 kHz operation, the mode-2 acoustic diaphragm resonant attenuation (dynamic response zero) is configured to lead the mode-3 actuator pressure piston resonant amplification (dynamic response pole) by a specific frequency bandwidth. To create this resonant interaction effect, the diaphragm drumhead resonance is dynamically tuned for approximately 11 kHz and the actuator pressure piston drumhead resonance is tuned to approximately 18 kHz. This resonant combination drastically minimizes the attenuated response above the piston diaphragm resonant frequency and works to provide a very broad and relatively uniform high acoustic output over a broad high frequency range. This amplification bandwidth extends approximately between the resonant bandwidth of the acoustic diaphragm and the resonant bandwidth of the actuator pressure piston.

Figure 9:
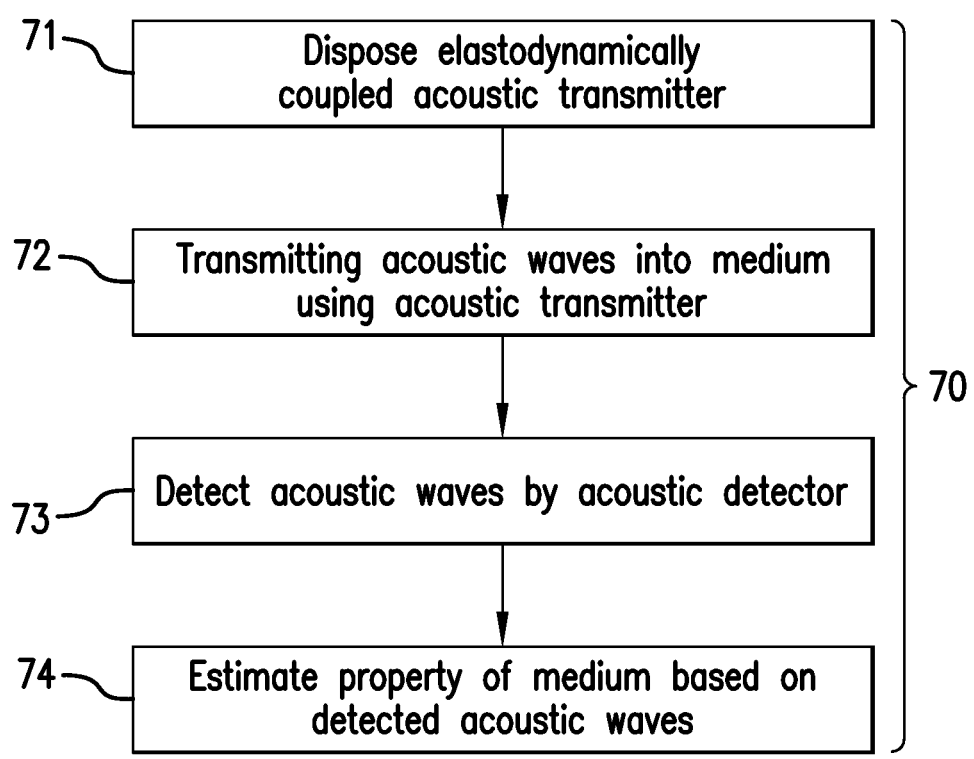
FIG. 9 is a flow diagram illustrating an exemplary embodiment of a method of transmitting acoustic waves and/or estimating a property of a medium.

FIG. 9 illustrates a method 70 for transmitting acoustic waves and/or measuring properties of an earth formation. The method 70 includes one or more stages 71-74. The method 70 is described herein in conjunction with the acoustic transmitter 22, 30, although the method 70 may be performed in conjunction with any number and configuration of elastodynamically coupled acoustic sources.

In a first stage 71, an acoustic transmitter 22, 30 is disposed at a selected location. In one embodiment, the selected location is a downhole location within a borehole.

In a second stage 72, an electric current is applied to the piezoelectric actuator assembly 32 to induce oscillating motion and transmit acoustic waves from the acoustic diaphragm 34 into a medium. In one embodiment, the electrical current is applied via a pulsed and/or oscillating voltage signal, such as a pulsed sinusoidal voltage. The medium may be any selected type of material, and in one example includes subterranean formation materials.

In a third stage 73, acoustic waves are detected by an acoustic detector. In one embodiment, the acoustic detector includes an acoustic diaphragm elastodynamically coupled to a piezoelectric structure as described above.

In a fourth stage 74, the received acoustic waves are utilized to estimate a property of the medium.

The systems and methods described herein provide various advantages over existing processing methods and devices. The systems and methods described herein allow for generation of very high acoustic energy levels over a broader frequency range of operation (e.g., 4 kHz to 25 kHz) relative to prior art devices. The apparatuses and methods provide a structural design that efficiently couples the unique dynamic characteristics of the self-stabilizing dynamic diaphragm with the high-force characteristics of a monolithic multilayer piezoelectric device. The highly incompressible material reduces damping effects and significantly increases acoustic output, particularly at lower frequencies (e.g. below 10 kHz). These and other advantages are described in conjunction with a description of analyses of the performance of embodiments of the apparatuses described herein.

A frequency response analysis was conducted on a mathematical model of an embodiment of the acoustic transmitter shown in FIG. 5 in a water medium. The acoustic transmitter, as discussed above includes a highly incompressible elastomer cavity. In this example, a thermally conductive silicone elastomer was used as the acoustic cavity material, in combination with an aluminum acoustic diaphragm and Aluminum-Beryllium alloy pressure piston.

Figure 10:
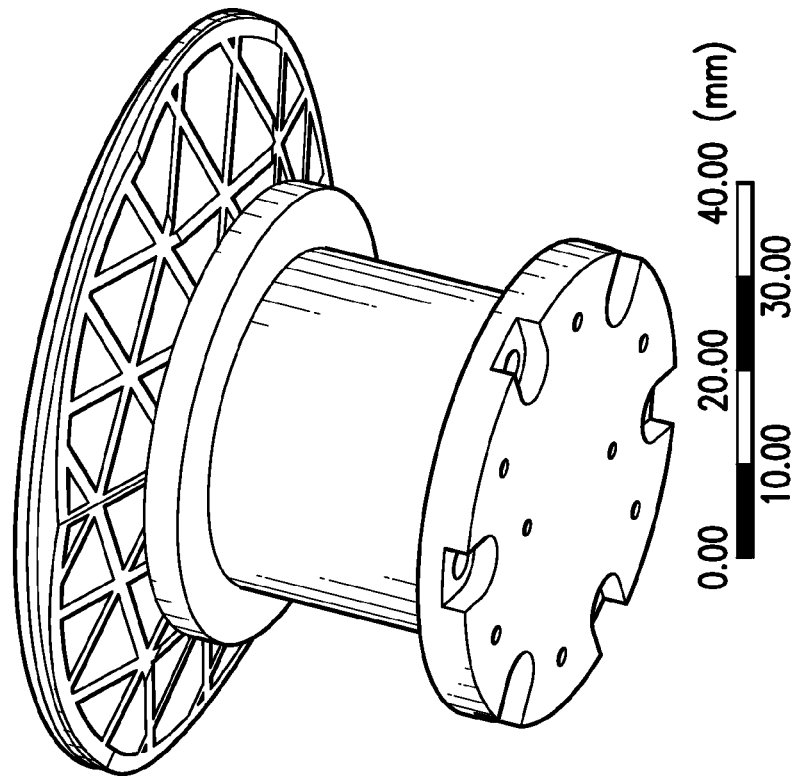
FIG. 10 is an illustration of a mathematical model of the acoustic transmitter of FIG. 5.
Figure 10:
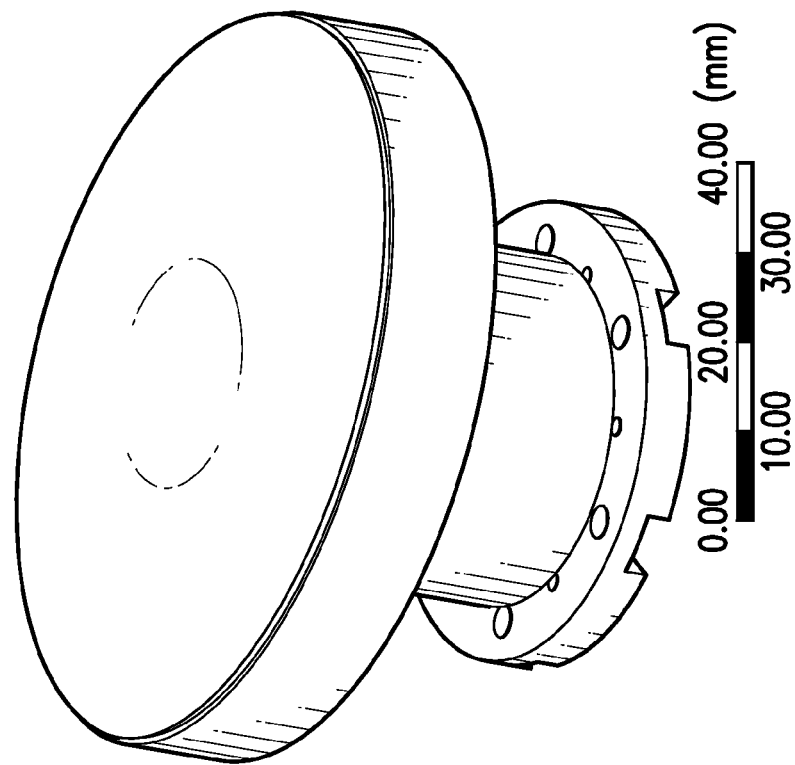

Referring to FIG. 10, a mathematical finite element model of the acoustic transmitter of FIG. 5 is illustrated. Some features and material properties of the acoustic transmitter are shown in Table 1

TABLE 1

| Assembly Component | Material Properties | | | | Comments |
|---|---|---|---|---|---|
| Diaphragm Piston (Al) | E = 71000 MPa | $\rho$ = 2770 kg/m$^3$ | $\nu$ = 0.32 | $\xi$ = 0.05 | elliptical: 70 mm × 85 mm |
| Elastomer Cavity (DOW SE-4430) | E = 0.622 MPa | $\rho$ = 2200 kg/m$^3$ | $\nu$ = 0.49995 | $\xi$ = 0.125 | K = 2100 MPa |
| Piezoelectric Actuator | E = 159000 MPa | $\rho$ = 7650 kg/m$^3$ | $\nu$ = 0.33 | $\xi$ = 0.05 | 14 mm × 14 mm × 20 mm |
| Pressure Disk (AlBeMet 162) | E = 193000 MPa | $\rho$ = 2120 kg/m$^3$ | $\nu$ = 0.17 | $\xi$ = 0.05 | Ø50 mm × 4 mm |
| Actuator Fitting (AlBeMet 162) | E = 193000 MPa | $\rho$ = 2120 kg/m$^3$ | $\nu$ = 0.17 | $\xi$ = 0.05 | |

In Table 1, "E" refers to Young's modulus or modulus of elasticity, "$\rho$" refers to mass density, "$\nu$" refers to Poisson's ratio, and "$\xi$" refers to the damping ratio. The highly incompressible elastomer material has a bulk modulus of about 2100 MPa. The diaphragm has an elliptical shape with a major diameter of about 85 mm and a minor axis of about 70 mm, and the pressure piston has a thickness of about 4 mm and a diameter of about 50 mm. The piezoelectric actuator has dimensions of about 14 mm×14 mm×20 mm.

Dynamic simulations were conducted in the form of direct frequency response analyses accounting for material dependent damping of the individual constituent components. The multi-physics aspects from coupling an external fluid medium were included in these simulations and the acoustic pressure output of the device was calculated based on the fluid-structure-interaction of the acoustic diaphragm and water medium.

Figure 11:
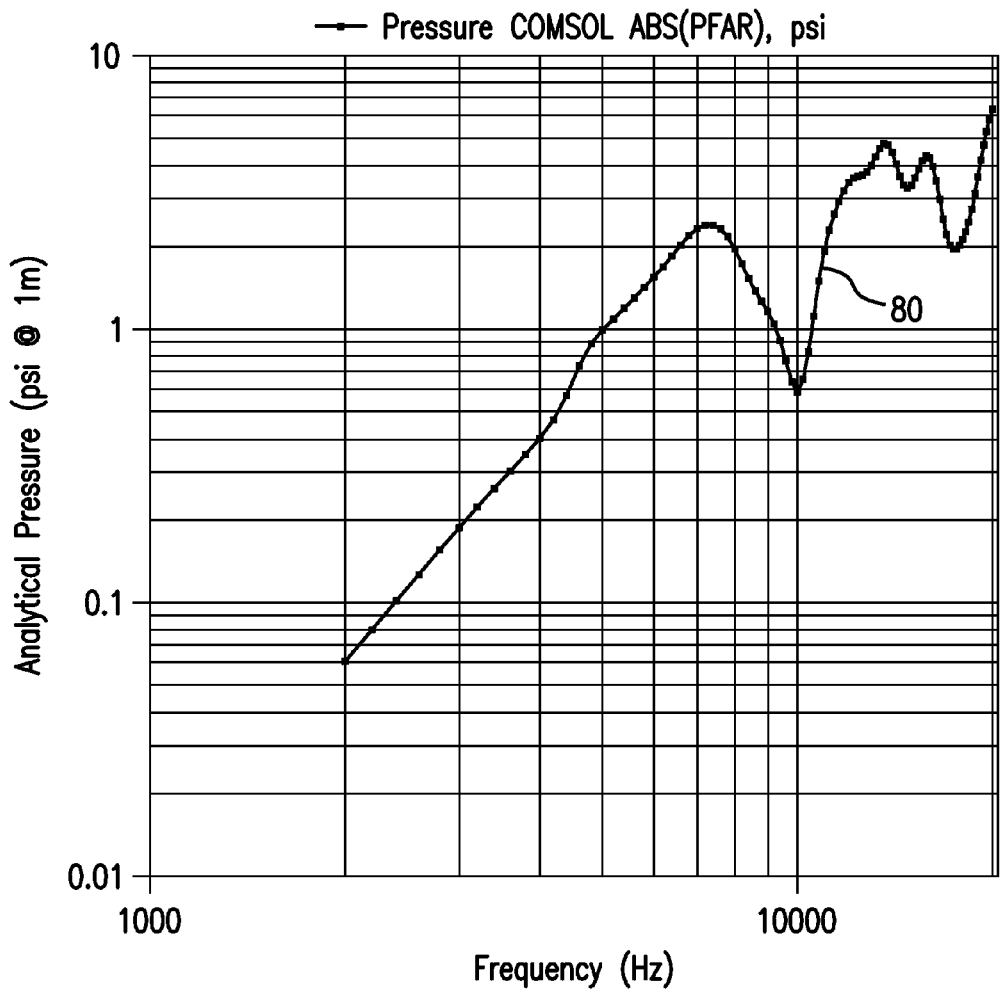
FIG. 11 is a data plot showing a pressure response of the model of FIG. 10 relative to frequency.
Figure 12:
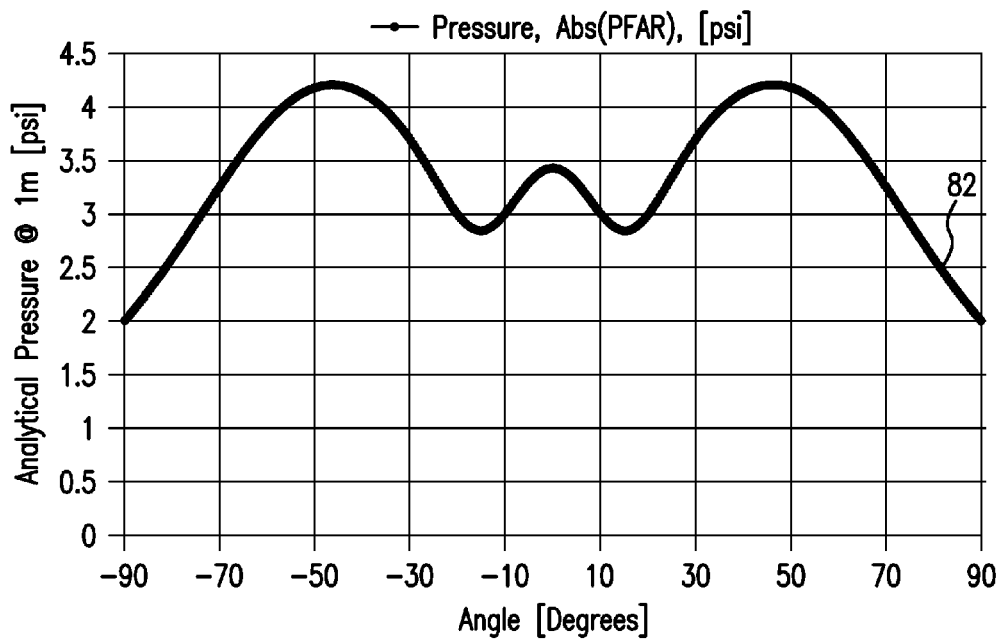
FIG. 12 is a polar data plot showing a pressure response of the model of FIG. 10 at a frequency of 12 kHz.
Figure 13:
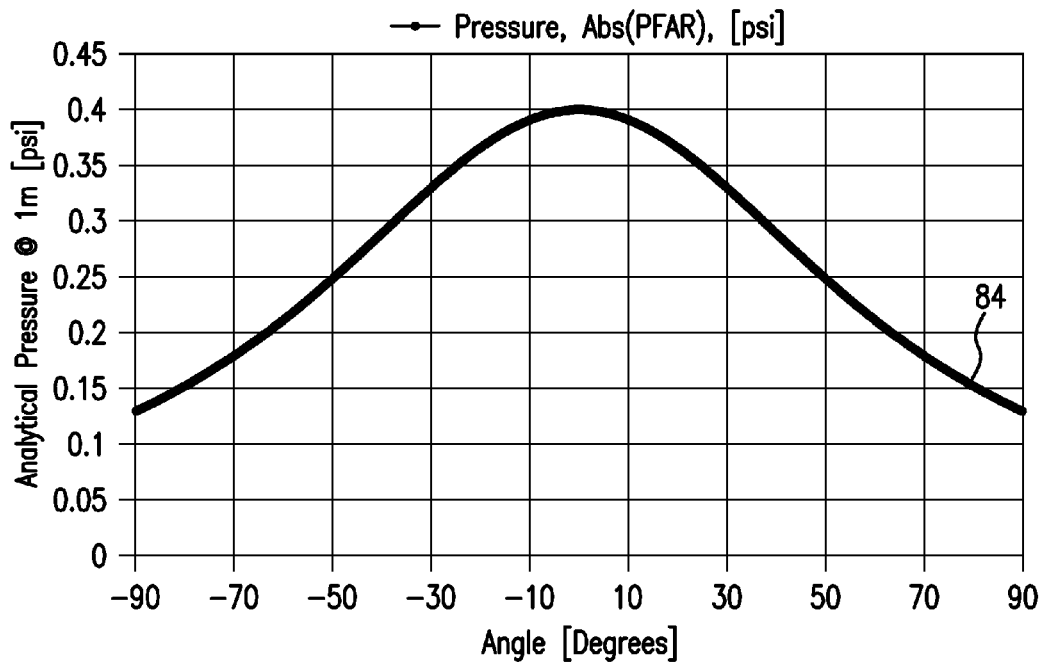
FIG. 13 is a polar data plot showing a pressure response of the model of FIG. 10 at a frequency of 4 kHz.

A series of frequency response analyses of the described acoustic source design was conducted to determine the dynamic response characteristics under axial motion of the piezoelectric actuator. Dynamic loading was applied to the piezoelectric actuator along the axis in the 20 mm dimension. The analytical results are shown in the data plots of FIGS. 11-13. FIG. 11 illustrates pressure response data 80 for the model at various operating frequencies. FIGS. 12 and 13 include pressure response data 82 and 84 at operating frequencies of 12 kHz and 4 kHz, respectively. FIGS. 11-13 indicate a moderately damped resonant response around 8 kHz and a somewhat higher resonant response near 14 kHz. The high frequency bandwidth exhibits a moderately damped response with rigid-body diaphragm acceleration that can translate to significant acoustic pressure over a broad bandwidth.

The model and results of FIGS. 11-13 illustrate a stabilized diaphragm structural dynamic response at the high frequency operating mode around 12 kHz combined with a low frequency resonant response that translate to significant acoustic energy output in a wide frequency range of between about 4-7 kHz. For example, FIGS. 12 and 13 show a significant pressure response at both 12 kHz and 4 kHz, respectively. It was determined that the low frequency response of the system is predominantly influenced by the motional dynamic mass of the system and the effective mechanical stiffness of the elastodynamic cavity. Conversely, the high frequency response of the system is predominantly influenced by the acoustic diaphragm and actuator pressure piston structural dynamic response characteristics.

Figure 14:
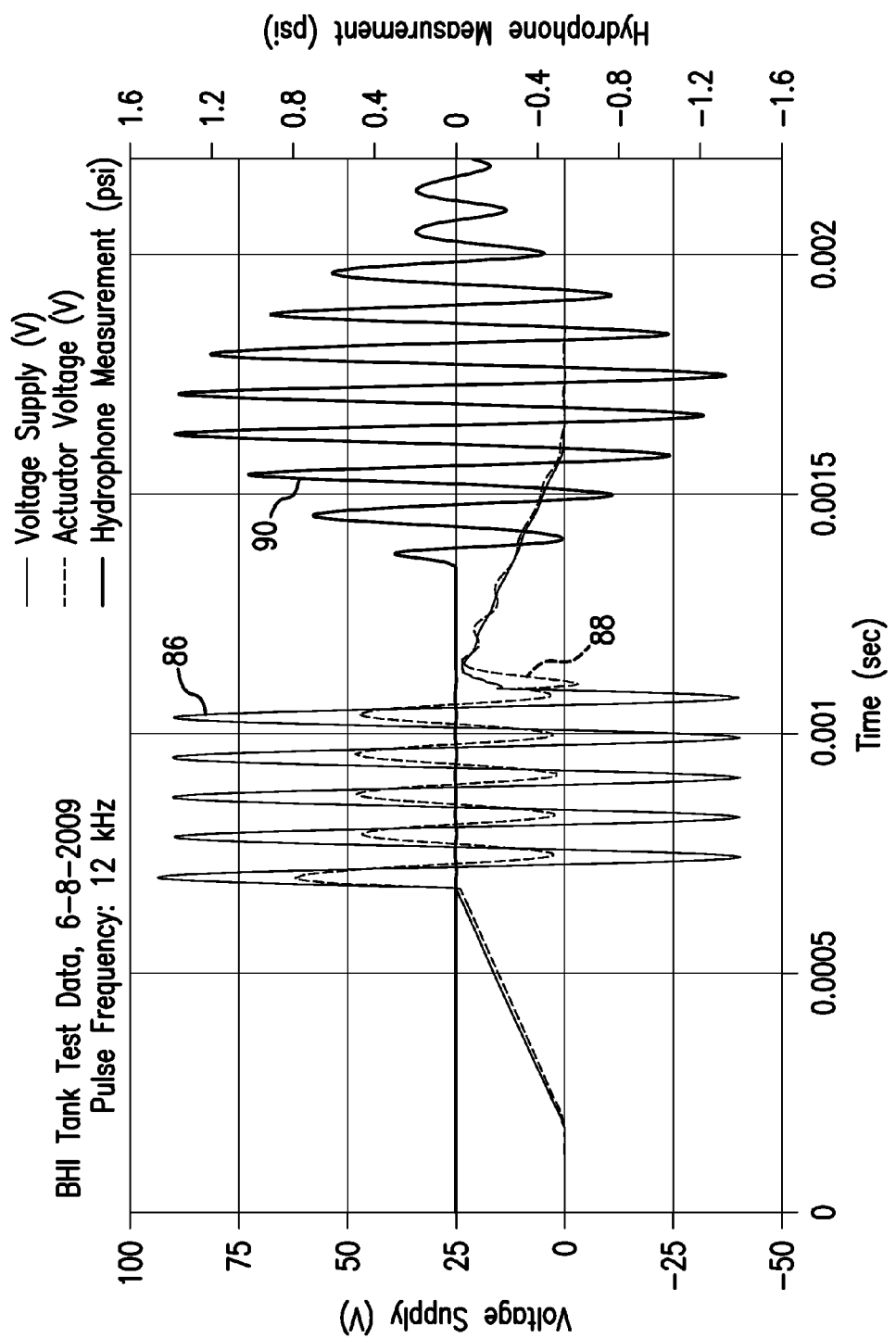
FIG. 14 is a data plot showing a pressure response of an elastodynamically coupled acoustic transmitter at a frequency of 12 kHz.
Figure 15:
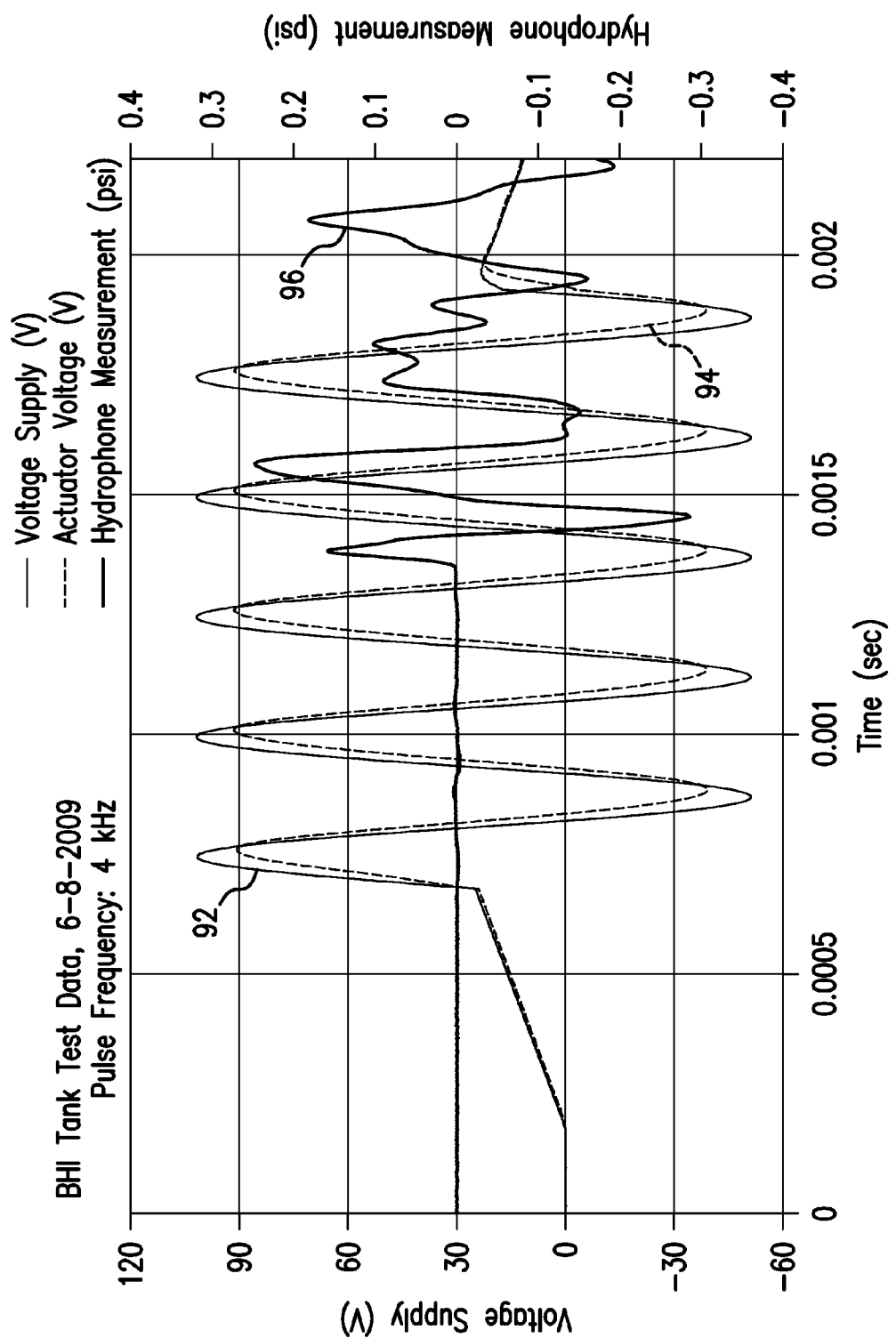
FIG. 15 is a data plot showing a pressure response of the acoustic transmitter of FIG. 14 at a frequency of 12 kHz.
Figure 16:
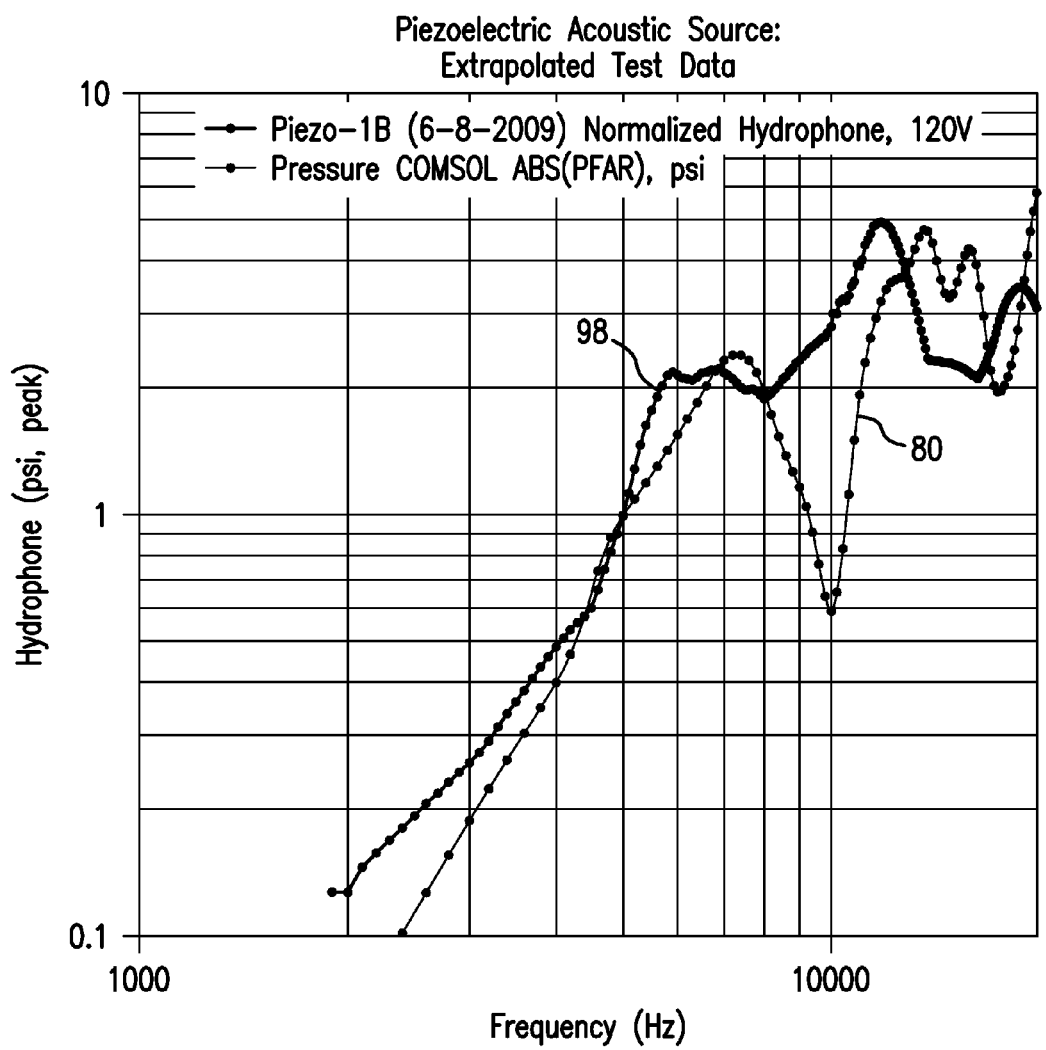
FIG. 16 is a data plot showing a pressure response of the acoustic transmitter of FIG. 14 relative to frequency.

FIGS. 14-16 illustrate results of a water tank test of an acoustic transmitter including elastodynamically coupled piezoelectric acoustic source. A series of acoustic measurements were obtained for operation of the piezoelectric actuator in a transient burst mode. Transient voltage bursts applied to the actuator typically included five sinusoidal pulses superimposed with a DC offset accounting for non-symmetric voltage limits of the piezoelectric actuator device. Acoustic measurements were conducted in fresh water at a depth of 2 meters utilizing a hydrophone device located 1 meter distance from the acoustic source test article. The test data shown in FIGS. 14-16 indicates the high acoustic output of the transmitter extends over a frequency range from less than or equal to approximately 4 kHz to well above 30 kHz.

A transient voltage waveform 86 having a 12 kHz pulse frequency as described in FIG. 14 was applied to the acoustic transmitter. As indicated in the data plot, the resulting voltage 88 across the actuator is significantly less than the applied supply voltage 86. This is due to the introduction of a series resistance determined necessary to control the transient currents that could potentially generate excessive accelerations and damage the piezoelectric actuator. The measured data 90 at a 12 kHz pulse frequency indicates approximately 1.35 psi (peak) acoustic pressure is developed by the acoustic transmitter at an actuator voltage of 65 V (peak-peak). The data 96 suggests an approximately 4.97 psi (peak) acoustic output can be expected at the intended operational voltage level of 240 V (peak-peak) across the actuator.

In addition, a transient voltage waveform 92 having a 4 kHz pulse frequency as described in FIG. 15 was applied the acoustic transmitter. As indicated in the data plot, the resulting voltage 94 across the actuator is only slightly reduced from the supply voltage applied. This is due to the reduced circuit current in the lower frequency range. The measured data 96 at a 4 kHz pulse frequency indicates approximately 0.27 psi (peak) acoustic pressure is developed by the prototype article at an actuator voltage of 131 V (peak-peak). The data 96 suggests approximately 0.49 psi (peak) acoustic output can be expected at the intended operational voltage level of 240 V (peak-peak) across the actuator. Total supply energy for the transient acoustic burst is 0.657 Joule.

A series of acoustic burst tests was also performed over a large frequency range. The measured acoustic data 98 was accumulated at a 100 Hz frequency step from 2 kHz to 20 kHz, and normalized to 240 V (peak-peak) actuator voltage. As shown in FIG. 16, which is a comparison of the pressure response data vs. frequency for the analytical model, the measured data corresponds with the model and shows a significant pressure response over a wide frequency range.

In support of the teachings herein, various analysis components may be used, including a digital and/or an analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An acoustic transmitter comprising:
   an acoustic diaphragm configured to transmit acoustic waves into a medium, the acoustic diaphragm being a solid structure having an acoustic surface configured to interact with the medium, a back surface opposite the acoustic surface and a plurality of structural members disposed opposite the acoustic surface and integral with the diaphragm, the acoustic diaphragm, wherein the back surface and the plurality of structural members have a rigidity that is greater than a rigidity of a highly incompressible elastomer;
a piezoelectric actuator assembly configured to deform in an axial direction in response to an applied electrical signal, the piezoelectric actuator assembly including a piezoelectric structure and a pressure piston attached to the piezoelectric structure, the pressure piston including a piston surface having a shape that generally conforms to at least a portion of the acoustic surface, the piston surface having a diameter that is equal to or greater than a diameter of the acoustic diaphragm; and
the highly incompressible elastomer entirely filling a cavity formed by the piezoelectric actuator, the back surface and the plurality of structural members, the highly incompressible elastomer configured to transmit pressure waves to the acoustic diaphragm in response to motion of the piezoelectric actuator, the pressure waves translating motion of the pressure piston into motion of the acoustic diaphragm, the piston surface and the back surface having a rigidity that is greater than a rigidity of the highly incompressible elastomer.

2. An acoustic transmitter comprising:
an acoustic diaphragm configured to transmit acoustic waves into a medium, the acoustic diaphragm being a solid structure having an acoustic surface configured to interact with the medium, a back surface opposite the acoustic surface and a plurality of structural members disposed opposite the acoustic surface and integral with the diaphragm, the acoustic diaphragm, wherein the back surface and the plurality of structural members have a rigidity that is greater than a rigidity of a highly incompressible elastomer;
a piezoelectric actuator configured to deform in an axial direction in response to an applied electrical signal;
a pressure piston attached to the piezoelectric actuator and disposed between the piezoelectric actuator and the acoustic diaphragm, the pressure piston having a piston surface, the piston surface, the plurality of structural members and the back surface defining a cavity between the pressure piston and the acoustic surface; and
the highly incompressible elastomer disposed between the pressure piston and the acoustic diaphragm and configured to transmit pressure waves to the acoustic diaphragm in response to motion of the piezoelectric actuator and the pressure piston, the pressure waves translating motion of the pressure piston into motion of the acoustic diaphragm, the elastomer entirely filling the cavity and contacting the piston surface, the plurality of structural members and the back surface.

3. The acoustic transmitter of claim 1, Wherein the acoustic diaphragm and the piezoelectric actuator are at least partially disposed in a cavity filled with the highly incompressible elastomer.

4. The acoustic transmitter of claim 1, wherein the highly incompressible elastomer has a compressibility that is lower than water when constrained.

5. The acoustic transmitter of claim 1, wherein the highly incompressible elastomer has a bulk modulus of at least about $2\times10^9$ Pa.

6. The acoustic transmitter of claim 1, wherein the pressure piston includes a surface having a shape that generally conforms to at least a portion of a surface of the acoustic diaphragm.

7. The acoustic transmitter of claim 6, wherein the surface of the pressure piston has a diameter that is equal to or greater than a diameter of the acoustic diaphragm.

8. The acoustic transmitter of claim 6, wherein the acoustic diaphragm is tuned to a first drumhead resonance, and the pressure piston is tuned to a second drumhead resonance that exceeds the first drumhead resonance by a selected frequency bandwidth.

9. The acoustic transmitter of claim 8, wherein the first drumhead resonance is approximately 11 kHz and the second drumhead resonance is approximately 18 kHz.

10. The acoustic transmitter of claim 1, wherein the plurality of structural members form a geometric cell structure.

11. The acoustic transmitter of claim 10, wherein the opposing surface of the pressure piston has a diameter that is at least equal to a diameter of the cell structure.

12. The acoustic transmitter of claim 1, wherein the acoustic transmitter is configured to be disposed in a borehole in an earth formation.

13. A method for estimating a property in a borehole penetrating an earth formation, the method comprising:
conveying a carrier through the borehole, the carrier comprising at least one acoustic transmitter, the acoustic transmitter including:
an acoustic diaphragm configured to transmit acoustic waves into a medium, the acoustic diaphragm being a solid structure having an acoustic surface configured to interact with the medium, a back surface opposite the acoustic surface and a plurality of structural members disposed opposite the acoustic surface and integral with the diaphragm, wherein the acoustic diaphragm, wherein the back surface and the plurality of structural members have a rigidity that is greater than a rigidity of a highly incompressible elastomer;
a piezoelectric actuator configured to deform in an axial direction in response to an applied electrical signal;
a pressure piston attached to the piezoelectric actuator and disposed between the piezoelectric actuator and the acoustic diaphragm, the pressure piston having a piston surface, the piston surface, the back surface and the plurality of structural members defining a cavity between the pressure piston and the acoustic surface; and
the highly incompressible elastomer disposed between the pressure piston and the acoustic diaphragm and configured to transmit pressure waves to the acoustic diaphragm in response to motion of the piezoelectric actuator and the pressure piston, the pressure waves translating motion of the pressure piston into motion of the acoustic diaphragm, the elastomer entirely filling the cavity and contacting the piston surface, the plurality of structural members and the back surface;
transmitting an acoustic wave into at least one of the borehole and the formation via the acoustic transmitter; and
receiving the acoustic wave using an acoustic detector to estimate the property.

14. The method of claim 13, wherein transmitting the acoustic wave includes applying at least one of a pulsed voltage signal and an oscillating voltage signal to induce oscillating motion in the piezoelectric actuator.

15. The method of claim 13, wherein the acoustic diaphragm includes a solid acoustic surface and a plurality of structural members disposed opposite the acoustic surface and forming a geometric cell structure, and the opposing surface of the pressure piston has a diameter that is equal to or greater than a diameter of the cell structure.

16. The method of claim 13, wherein the acoustic diaphragm and the piezoelectric actuator are at least partially disposed in a cavity filled with the highly incompressible elastomer.

17. The method of claim 13, wherein the pressure piston includes a surface having a shape that generally conforms to at least a portion of a surface of the acoustic diaphragm.

18. The method of claim 17, wherein the acoustic diaphragm is tuned to a first drumhead resonance, and the pressure piston is tuned to a second drumhead resonance that exceeds the first drumhead resonance by a selected frequency bandwidth.

19. The method of claim 18, wherein the first drumhead resonance is approximately 11 kHz and the second drumhead resonance is approximately 18 kHz.

\* \* \* \* \*